United States Patent
Ljolje

(10) Patent No.: US 8,600,749 B2
(45) Date of Patent: Dec. 3, 2013

(54) SYSTEM AND METHOD FOR TRAINING ADAPTATION-SPECIFIC ACOUSTIC MODELS FOR AUTOMATIC SPEECH RECOGNITION

(75) Inventor: Andrej Ljolje, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 867 days.

(21) Appl. No.: 12/633,334

(22) Filed: Dec. 8, 2009

(65) Prior Publication Data

US 2011/0137650 A1   Jun. 9, 2011

(51) Int. Cl.
*G10L 15/06* (2013.01)
(52) U.S. Cl.
USPC ........................................ 704/244; 704/256.1
(58) Field of Classification Search
USPC ................................................. 704/231–257
See application file for complete search history.

(56) References Cited

U.S. PATENT DOCUMENTS 5,806,030 A * 9/1998 Junqua ........................ 704/245
5,963,902 A * 10/1999 Wang ........................... 704/243

OTHER PUBLICATIONS

Y. Mormandin; Optimal Splitting of HMM Gaussian Mixture components with MMIE Training; IEEE, Centre de Recherche Informatique de Montreal. pp. 449-452, Pub. date 1995.*
IBM Technical Disclosure Bulletin; Automatic Speech segment Boundary Detection Using Markov Models; vol. 33; Issue No. 7; pp. 323-324; Publication Date Dec. 1, 1990.*

\* cited by examiner

*Primary Examiner* — Abul Azad

(57) ABSTRACT

Disclosed herein are systems, methods, and computer-readable storage media for training adaptation-specific acoustic models. A system practicing the method receives speech and generates a full size model and a reduced size model, the reduced size model starting with a single distribution for each speech sound in the received speech. The system finds speech segment boundaries in the speech using the full size model and adapts features of the speech data using the reduced size model based on the speech segment boundaries and an overall centroid for each speech sound. The system then recognizes speech using the adapted features of the speech. The model can be a Hidden Markov Model (HMM). The reduced size model can also be of a reduced complexity, such as having fewer mixture components than a model of full complexity. Adapting features of speech can include moving the features closer to an overall feature distribution center.

20 Claims, 3 Drawing Sheets

SYSTEM AND METHOD FOR TRAINING ADAPTATION-SPECIFIC ACOUSTIC MODELS FOR AUTOMATIC SPEECH RECOGNITION

BACKGROUND

1. Technical Field

The present disclosure relates to automatic speech recognition and more specifically to adaptation-specific acoustic models.

2. Introduction

Automatic speech recognition (ASR) systems adapt features to existing models. Some automatic speech recognition systems adapt features in terms of just one speech segment at a time, i.e. a mixture of Gaussian distributions, to find the nearest one to the new speech. However, if the speaker is an outlier, and is close to the boundary of the overall speech statistics for that sound, a local mixture component is close to it, the change in the feature will be minimal. The minimal change leads to a relatively small overall performance increase. This approach often leads to misrecognitions, slow performance, and upset users.

The main problem in the approaches known in the art is that the model used is very rich in structure; it has many distributions in a mixture representing a speech sound. When the ASR system performs adaptation, it matches a speech frame to the nearest distribution in a mixture and transforms it to match as well as possible. This can result in the ASR system moving features away from the overall centroid for the given sound, which leads to poor ASR system and/or spoken dialog system performance.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
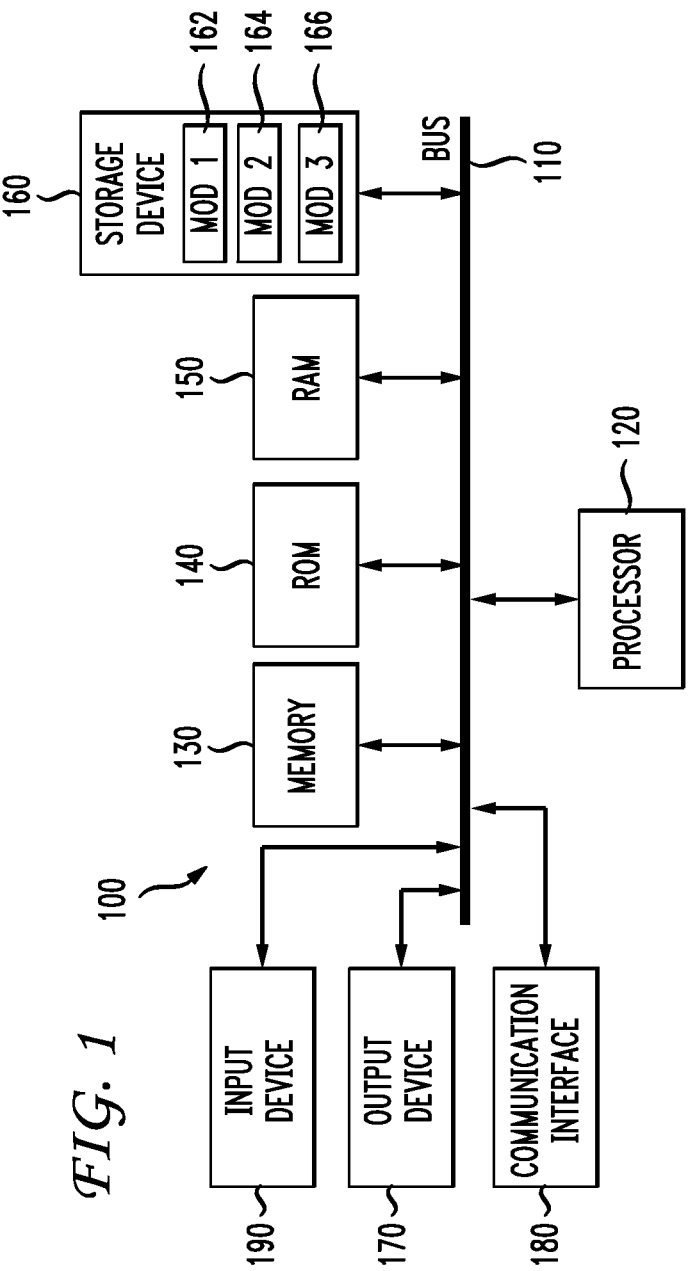
FIG. 1 illustrates an example system embodiment.

Automatic speech recognition (ASR) systems adapt features to existing models. Rather than adapting features in terms of just one speech segment at a time, i.e. a mixture of Gaussian distributions, to find the nearest one to the new speech, the approach disclosed herein has only a very small number of distributions (one or very few). This approach leads to a larger change in the new data closer to the center of all of the data for that model. After several iterations, this change is compounded and the final model has much smaller variances, leading to higher recognition accuracies.

Many speaker adaptation/personalization techniques in ASR acoustic modeling work significantly better if they are first applied in a recursive training algorithm. The system adapts training data to the model, and retrains the model. The system uses the retrained model to adapt the speech of a new speaker at recognition time. The technique disclosed herein introduces an additional step of using a model with a single distribution for each speech sound, which adapts the data to be as close as possible to the overall centroid, not just the local one. This approach introduces an additional step in recursive training. Instead of using a fully-trained full size model for adapting the speech data, the system uses a model of reduced complexity to adapt the features. The model of reduced complexity has the same Hidden Markov Model (HMM) structure as a model of full complexity but less mixture components. A speech recognition and/or dialog system can adjust the variables of size and speed of increasing the size of the "small" model to achieve a desired performance level. Next the system adapts the speech and generates two new models, a full size model and a reduced size model. The system uses the full size model for forced alignment, i.e. finding where the speech segments are. The system uses the reduced size model to adapt the features based on the forced alignment. In this manner, the system moves features closer to the center of the overall distribution, not just the local center. During the recursion, the system gradually increases the smaller model size until it reaches the size of the full size model, thereby making the transition smooth. The system can vary the rate of increase to trade off the speed of training versus the smoothness of the transition.

This approach increases the change in the features during the adaptation process, and moves features closer to the overall center of the distribution that describes all of the speech corresponding to that phoneme segment in some phonemic context. The result is a model that is more homogeneous, with smaller variances and better separation between different speech sounds. The acoustic model is also more "generic", or devoid of any speaker characteristics.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
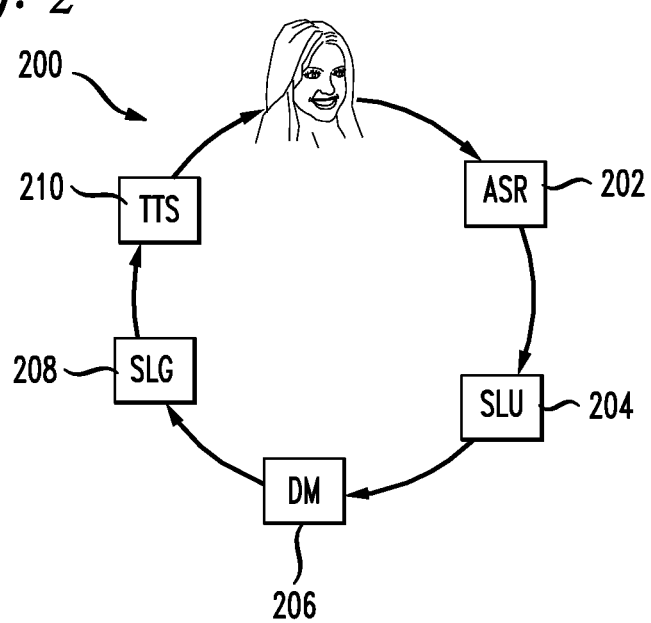
FIG. 2 illustrates an exemplary block diagram of an automatic speech recognition system.

FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system.

For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

Figure 3:
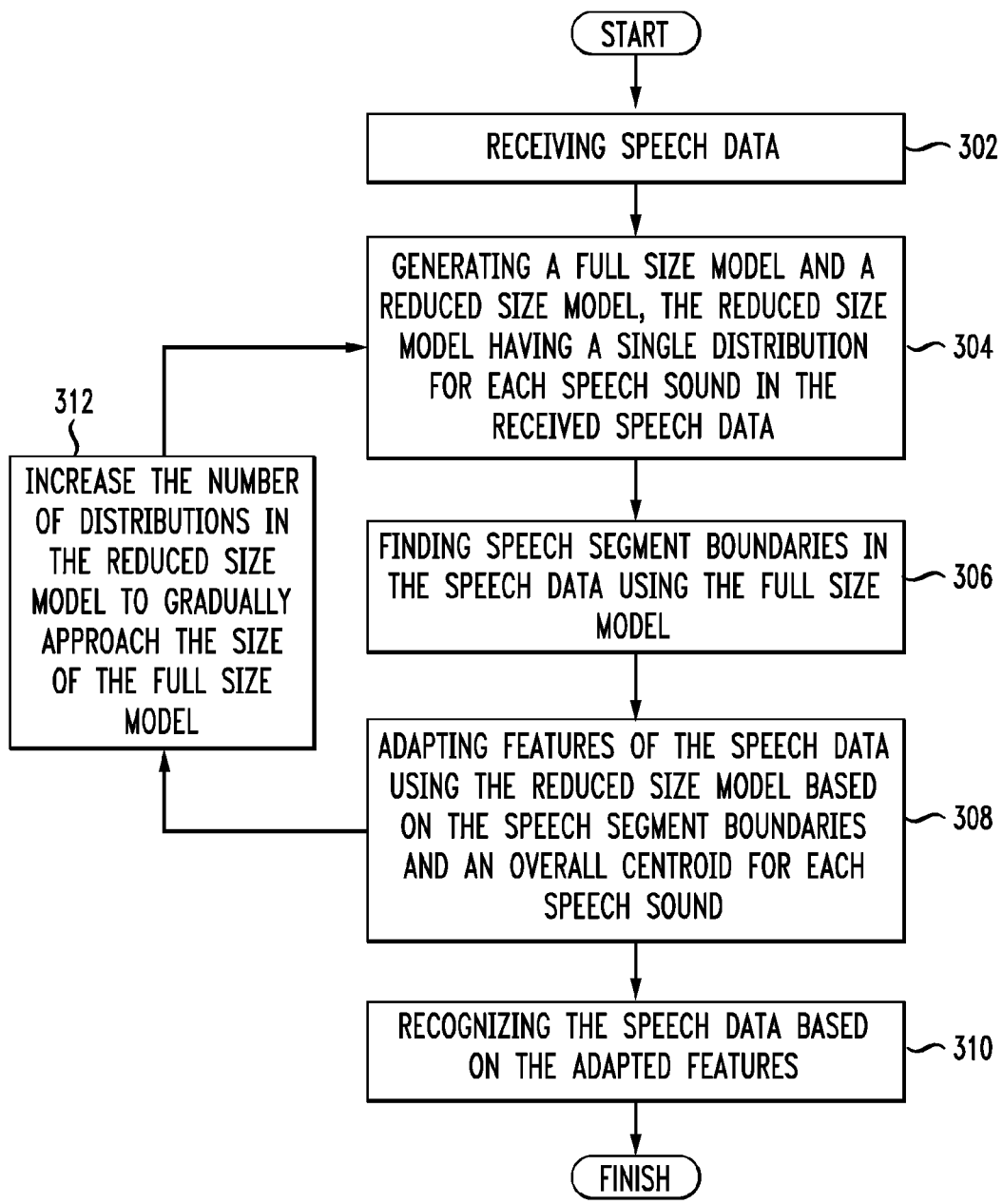
FIG. 3 illustrates an example method embodiment for training adaptation-specific acoustic models.

Having disclosed some basic system components, the disclosure now turns to the exemplary method embodiment shown in FIG. 3. For the sake of clarity, the method is discussed in terms of an exemplary system such as is shown in FIG. 1 configured to practice the method. The system 100 performs segmentation using a large model, and adapts features using the small model. The system 100 performs recursion to gradually increase the size of the small model until it reaches the size of the large model. For example, the system can start by building one model with 32 components and one with 1 component. The system aligns with the 32-component model, adapts with the 1-component model, and generates new adapted features. The system gradually increases the size of the "small" model. The system builds a 32-component model and 3-component model, aligns and adapts. Then the system builds a 32-component model and 9-component model, aligns and adapts. The system continues to gradually increase the small model and builds a 32-component model and 27-component model, aligns and adapts. Finally, the system builds the 32-component model. This approach allows for either a very rapid change in the number of components (i.e. from 1 to all instantaneously), or a slower gradual increase from 1 to all.

The solution introduces an additional step of recursive training. Instead of using a fully-trained full size model for adapting the speech data, the system 100 adapts features using a model of reduced complexity. In one aspect, the model of reduced complexity has the same Hidden Markov Model (HMM) structure, but only one or very few mixture components per state. Next the system adapts speech and generates two new models—a full size model and a reduced size model. The system uses the full size model for forced alignment, i.e. finding where the speech segments are. The system uses the reduced size model to adapt the features. This approach allows the features to move close to the center of the overall distribution, not just the local center.

FIG. 3 illustrates a method of training adaptation-specific acoustic models. A system 100 practicing the method first receives speech data (302). The system 100 generates a full size model and a reduced size model, the reduced size model starting with a single distribution for each speech sound in the received speech data (304). The full size model and/or the reduced size model can be a Hidden Markov Model (HMM). The reduced size model is a model of reduced complexity. Reduced complexity can mean less mixture components overall. In one aspect, a reduced complexity model has less mixture components per state than a model of full complexity. In one variation, the system recursively increases the number of distributions in the reduced size model in order to gradually approach the size of the full size model (312). During the recursion, the system gradually increases the smaller model size until it reaches the size of the full size model, thereby making the transition smooth. The system can vary the rate of increase to trade off the speed of training versus the smoothness of the transition.

Then the system 100 finds speech segment boundaries in the speech data using the full size model (306) and adapts features of the speech data using the reduced size model based on the speech segment boundaries and an overall centroid for each speech sound (308). Adapting features of the speech data can include moving features closer to a center of an overall feature distribution. After training, the system can adapt recognition features using the final model and recognize speech using the adapted recognition features. The system 100 recognizes the speech data based on the adapted features (310). In one aspect, the system 100 recursively trains a recognition model based on the adapted features. In this case, the system can further adapt speech of a new speaker at recognition time using the recursively trained model.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method comprising:
   receiving speech data, to yield received speech data;
   generating, via a computing device, a full size adaptation-specific acoustic model and a reduced size adaptation-specific acoustic model, the reduced size adaptation-specific acoustic model starting with a single distribution for each speech sound in the received speech data;
   finding speech segment boundaries in the received speech data using the full size adaptation-specific acoustic model;
   increasing a size of the reduced size adaptation-specific acoustic model using the full size adaptation-specific acoustic model to meet a desired performance level, to yield a modified reduced size adaptation-specific acoustic model;
   after the finding of the speech segment boundaries, adapting features of the received speech data using the modified reduced size adaptation-specific acoustic model based on the speech segment boundaries and an overall centroid for each speech sound, to yield adapted features; and
   recognizing the received speech data based on the adapted features.

2. The method of claim 1, wherein the full size adaptation-specific acoustic model and the reduced size adaptation-specific model are hidden markov models.

3. The method of claim 1, wherein the reduced size adaptation-specific acoustic model is a model of reduced complexity.

4. The method of claim 3, wherein the reduced size adaptation-specific acoustic model has less mixture components than a model of full complexity.

5. The method of claim 3, wherein the reduced size adaptation-specific acoustic model has less mixture components per state than a model of full complexity.

6. The method of claim 1, wherein adapting features of the received speech data further comprises moving the features closer to a center of an overall feature distribution.

7. The method of claim 1, further comprising recursively training a recognition model based on the adapted features, to yield a recursively trained model.

8. The method of claim 7, further comprising adapting speech of a new speaker at recognition time using the recursively trained model.

9. A system comprising:
   a processor; and
   a computer-readable storage device having instructions stored which, when executed by the processor, result in the processor performing operations comprising:
      receiving speech data, to yield received speech data;
      generating a full size adaptation-specific acoustic model and a reduced size adaptation-specific acoustic model, the reduced size adaptation-specific acoustic model starting with a single distribution for each speech sound in the received speech data;
      finding speech segment boundaries in the received speech data using the full size adaptation-specific acoustic model;
      increasing a size of the reduced size adaptation-specific acoustic model using the full size adaptation-specific acoustic model to meet a desired performance level, to yield a modified reduced size adaptation-specific acoustic model;
      after the finding of the speech segment boundaries, adapting features of the received speech data using the modified reduced size adaptation-specific acoustic model based on the speech segment boundaries and an overall centroid for each speech sound, to yield adapted features; and
      recognizing the received speech data based on the adapted features.

10. The system of claim 9, wherein the full size adaptation-specific acoustic model and the reduced size adaptation-specific model are hidden markov models.

11. The system of claim 9, wherein the reduced size adaptation-specific acoustic model is a model of reduced complexity.

12. The system of claim 11, wherein the reduced size adaptation-specific acoustic model has less mixture components than a model of full complexity.

13. The system of claim 11, wherein the reduced size adaptation-specific acoustic model has less mixture components per state than a model of full complexity.

14. The system of claim 9, wherein the adapting of the features of the received speech data further comprises moving the features closer to a center of an overall feature distribution.

15. The system of claim 9, the computer-readable storage device having additional instructions stored which result in the operations further comprising recursively training a recognition model based on the adapted features, to yield a recursively trained model.

16. The system of claim 15, the computer-readable storage device having additional instructions stored which result in the operations further comprising adapting speech of a new speaker at recognition time using the recursively trained model.

17. A computer-readable storage device having instructions stored which, when executed by a computing device, cause the computing device to perform operations comprising:
   receiving speech data, to yield received speech data;
   generating a full size adaptation-specific acoustic model and a reduced size adaptation-specific acoustic model, the reduced size adaptation-specific acoustic model starting with a single distribution for each speech sound in the received speech data;
   finding speech segment boundaries in the received speech data using the full size adaptation-specific acoustic model;
   increasing a size of the reduced size adaptation-specific acoustic model using the full size adaptation-specific acoustic model to meet a desired performance level, to yield a modified reduced size adaptation-specific acoustic model;
   after the finding of the speech segment boundaries, adapting features of the received speech data using the modified reduced size adaptation-specific acoustic model based on the speech segment boundaries and an overall centroid for each speech sound, to yield adapted features; and
   recognizing the received speech data based on the adapted features.

18. The computer-readable storage device of claim 17, wherein the full size adaptation-specific acoustic model and the reduced size adaptation-specific model are hidden markov models.

19. The computer-readable storage device of claim 18, wherein the reduced size adaptation-specific acoustic model is a model of reduced complexity.

20. The computer-readable storage device of claim 19, wherein the reduced size adaptation-specific acoustic model has less mixture components than a model of full complexity.

* * * * *